(12) United States Patent
Glinski et al.

(10) Patent No.: US 8,490,658 B2
(45) Date of Patent: Jul. 23, 2013

(54) AUTOMATIC WINDING OF WIRE FIELD IN WIRE SLICING MACHINE

(75) Inventors: Lukasz A. Glinski, Worcester, MA (US); Debabrata Ghosh, Acton, MA (US)

(73) Assignees: Saint-Gobain Abrasives, Inc., Worcester, MA (US); Saint-Gobain Abrasifs, Conflans-Sainte-Honorine (FR)

( * ) Notice: Subject to any disclaimer, the term of this patent is extended or adjusted under 35 U.S.C. 154(b) by 584 days.

(21) Appl. No.: 12/710,668

(22) Filed: Feb. 23, 2010

(65) Prior Publication Data
US 2010/0218842 A1    Sep. 2, 2010

Related U.S. Application Data

(60) Provisional application No. 61/155,643, filed on Feb. 26, 2009.

(51) Int. Cl.
*B21F 3/00* (2006.01)
*B65H 81/06* (2006.01)

(52) U.S. Cl.
USPC .................. 140/92.1; 140/92.2; 242/443

(58) Field of Classification Search
USPC .............. 140/92.1, 92.2; 242/443, 443.1, 242/448, 473.8
See application file for complete search history.

(56) References Cited

U.S. PATENT DOCUMENTS

| | | | |
|---|---|---|---|
| 3,478,732 A | 11/1969 | Clark et al. | |
| 3,841,297 A | 10/1974 | Mech | |
| 4,938,428 A | 7/1990 | Zaman et al. | |
| 5,052,366 A | 10/1991 | Matsukura | |
| 5,829,424 A | 11/1998 | Hauser | |
| 6,041,766 A | 3/2000 | Vojtechovsky | |
| 6,095,129 A | 8/2000 | Kanemichi et al. | |
| 6,135,103 A | 10/2000 | Katamachi | |
| 6,237,585 B1 | 5/2001 | Oishi et al. | |
| 6,390,896 B1 | 5/2002 | Huber et al. | |
| 6,401,333 B1 * | 6/2002 | Suzuki et al. | 242/443 |
| 6,889,684 B2 | 5/2005 | McAulay et al. | |
| 6,941,940 B1 | 9/2005 | Zavattari et al. | |
| 7,124,797 B2 * | 10/2006 | Anderson et al. | 242/430 |
| 7,284,548 B2 | 10/2007 | Matsuda | |

(Continued)

FOREIGN PATENT DOCUMENTS

| | | |
|---|---|---|
| EP | 0767036 A1 | 4/1997 |
| EP | 1698433 A1 | 9/2006 |

(Continued)

OTHER PUBLICATIONS

PCT Application No. PCT/US2010/025167, Filed Feb. 24, 2010, "Notification of Transmittal of the International Search Report and The Written Opinion of the International Searching Authority, or the Declaration", dated Oct. 11, 2010, 8 pages.

(Continued)

*Primary Examiner* — Teresa M Ekiert
(74) *Attorney, Agent, or Firm* — Joseph P. Sullivan; Abel Law Group, LLP

(57) ABSTRACT

Automatic winding of a wire field in a wire slicing machine is disclosed. In one embodiment, a wire field is automatically generated in a wire slicing machine by unloading wire from at least one wire spool and winding the wire about one or more wire guides to form the wire field.

12 Claims, 7 Drawing Sheets

U.S. PATENT DOCUMENTS

| | | |
|---|---|---|
| 7,387,118 B2 | 6/2008 | Komeda |
| 2001/0002561 A1 | 6/2001 | Shiraga et al. |
| 2004/0107648 A1 | 6/2004 | Sung |
| 2006/0258268 A1 | 11/2006 | Miyata et al. |
| 2007/0023027 A1* | 2/2007 | Nakai et al. ............... 125/21 |
| 2007/0131213 A1 | 6/2007 | Matsuda |

FOREIGN PATENT DOCUMENTS

| | | |
|---|---|---|
| EP | 1717001 A1 | 11/2006 |
| JP | S61-100364 | 5/1986 |
| JP | 12647464 A | 10/1989 |
| JP | 9029610 A | 2/1997 |
| JP | 110286541 A | 2/1999 |
| JP | H11-028654 | 2/1999 |
| JP | H11-028655 | 2/1999 |
| JP | 2000158319 A | 6/2000 |
| JP | 2002113650 A | 4/2002 |
| JP | 2003-165047 | 6/2003 |
| JP | 2005-186202 | 7/2005 |
| JP | 2007-111823 | 5/2007 |

OTHER PUBLICATIONS

Takatori Corp., "MWS Division, Cutting Machinery Series", Retrieved from: http://www.takatori-g.co.jp/e_products_cut/mws.html, printed Feb. 6, 2009, pp. 1-7.

Saint-Gobain Abrasives, "Fixed-Diamond Wire", 2004, Form # 7877, Retrieved from: http://www.electronics.saint-gobain.com/uploadedFiles/SGelectronics/Documents/WinterDiamondWireBrochure-207877.pdf, 4 pages.

* cited by examiner

AUTOMATIC WINDING OF WIRE FIELD IN WIRE SLICING MACHINE

CROSS REFERENCE TO RELATED APPLICATIONS

This application claims the benefit of U.S. Provisional Application Ser. No. 61/155,643 filed on Feb. 26, 2009 and entitled "AUTOMATIC WINDING OF WIRE FIELD IN WIRE SLICING MACHINE", which is incorporated by reference herein in its entirety.

BACKGROUND

The present invention relates generally to wire slicing machines and more particularly, to automatically building a wire field in a wire slicing machine for use in performing slicing operations.

In a typical wire slicing machine, an operator manually builds the wire field that is used in performing the slicing operations. In particular, the operator begins by physically taking wiring that has been loaded onto a wire spool using his or her hand or a weighted device and winds the wire around a first groove formed in three or four wire guides integrated into the wire slicing machine. The operator then makes another loop around the wire guides by placing the wire in the next adjacent set of grooves using his or her hand or the weighted device to maintain tension on the wire and prevent the wire from unwinding. The operator continues making loops of the wire around the subsequent grooves until a wire field has been built around the wire guides. Winding a wire field in a wire slicing machine in this manner is labor intensive and can take anywhere from thirty minutes up to four hours and even skilled operators can still end up with a wire field that does not have proper tension or has some damage due to handling. Improper tension can eventually affect the capability of the wire slicing machine to perform slicing operations on workpieces and possibly lead to an interruption in production.

SUMMARY

In one embodiment, there is a wire handling assembly. In this embodiment, the wire handling assembly comprises at least one wire spool, one or more wire guides operatively connected with the at least one wire spool, and a controller operatively in communication with the at least one wire spool and the one or more wire guides. The controller is configured to direct the at least one wire spool and one or more wire guides to automatically unload wire from the at least one wire spool and build a wire field about the one or more wire guides.

In a second embodiment, there is a system for automatically winding a wire field in a wire slicing machine having at least one wire spool configured to accommodate a wire and one or more wire guides configured to receive the wire from the at least one wire spool. In this embodiment, the system comprises a controller configured to direct the at least one wire spool and one or more wire guides to automatically unload the wire from the at least one wire spool and build a wire field about the one or more wire guides.

In a third embodiment, there is a fixed abrasive wire slicing machine. In this embodiment, the fixed abrasive wire slicing machine comprises at least one wire spool configured to accommodate a fixed abrasive wire. One or more wire guides are configured to receive the fixed abrasive wire from the at least one wire spool. A controller is configured to direct the at least one wire spool and one or more wire guides to automatically unload the fixed abrasive wire from the at least one wire spool and build a wire field about the one or more wire guides.

In a fourth embodiment, there is a fixed abrasive wire slicing system. In this embodiment, the fixed abrasive wire slicing system comprises a linear positioning stage; at least one wire spool configured to accommodate a fixed abrasive wire that is rotatably mounted about the linear positioning stage; a rotary stage; one or more wire guides rotatably mounted about the rotary stage; wherein each of the one or more wire guides comprises a plurality of grooves formed therein to accommodate the fixed abrasive wire; and a controller operatively in communication with the linear positioning stage, at least one wire spool, rotary stage and the one or more wire guides, wherein the controller is configured to direct the linear positioning stage, at least one wire spool, rotary stage and the one or more wire guides to automatically unload the fixed abrasive wire from the at least one wire spool and build a wire field about the one or more wire guides.

In a fifth embodiment, there is a method of automatically building a wire field, comprising: loading a wire onto at least one wire spool; automatically unloading the wire from the at least one wire spool onto one or more wire guides; and automatically building a wire field about the one or more wire guides in accordance with a plurality of wire parameters.

In a sixth embodiment, there is a method of automatically building a field of fixed abrasive wire in a wire slicing machine having at least one wire spool configured to accommodate a fixed abrasive wire and one or more wire guides that receives the fixed abrasive wire from the at least one wire spool on a plurality of grooves. In this embodiment, the method comprises: automatically unloading the fixed abrasive wire from the at least one wire spool onto one or more wire guides; and automatically building a field of fixed abrasive wire about the one or more wire guides.

In a seventh embodiment, there is a computer readable storage medium storing computer instructions, which when executed by a computer system enables a wire slicing machine to automatically generate a wire field for performing a slicing operation. In this embodiment, the computer instructions comprise: loading a wire onto at least one wire spool; automatically unloading the wire from the at least one wire spool onto one or more wire guides; and automatically building the wire field about the one or more wire guides in accordance with a plurality of wire parameters.

DETAILED DESCRIPTION OF THE EMBODIMENTS

Figure 1:
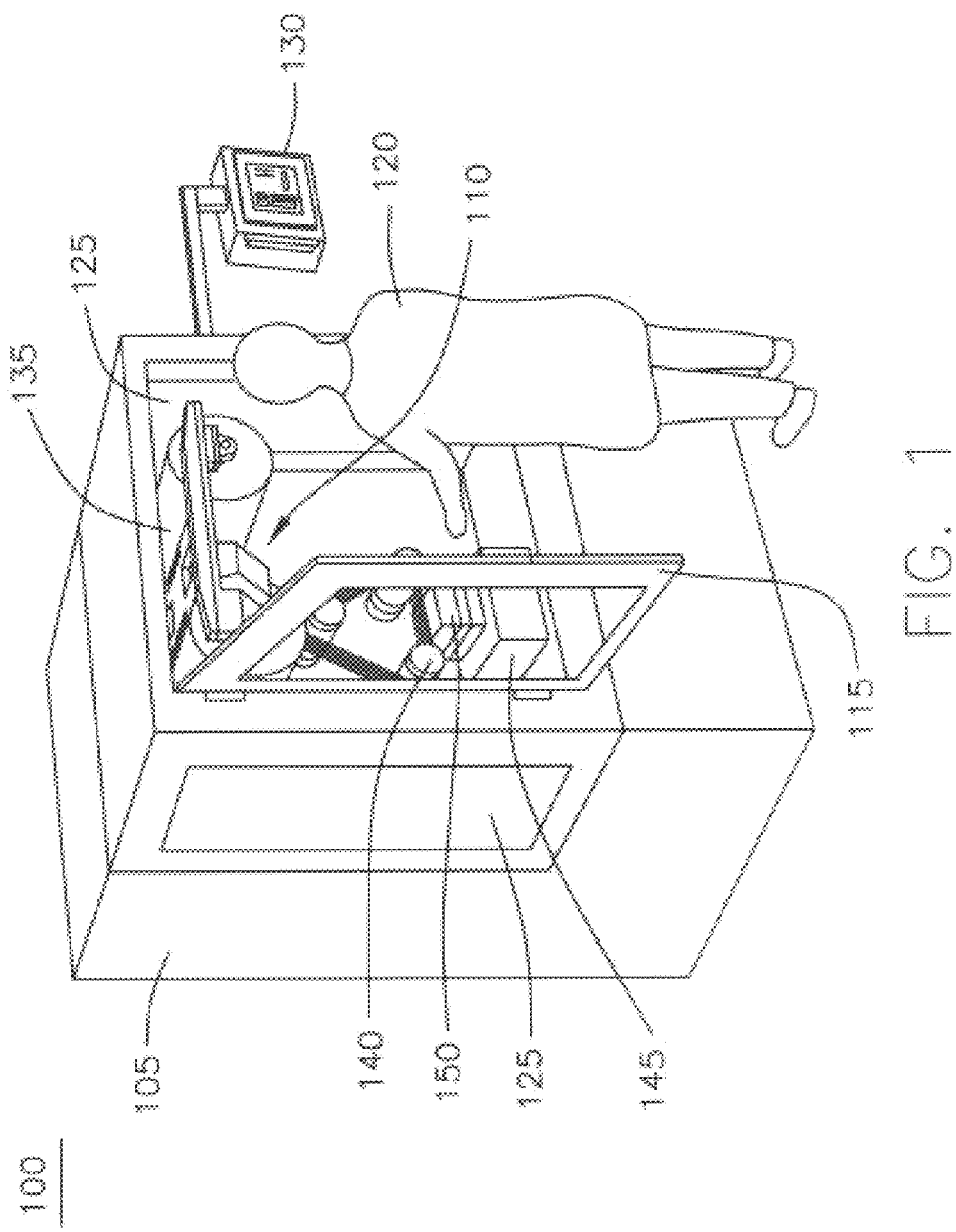
FIG. 1 is a schematic illustration of a wire slicing machine that includes a wire handling assembly for automatically building a wire field according to one embodiment.

FIG. 1 is a schematic illustration of a wire slicing machine 100 that includes a wire handling assembly for automatically building a wire field according to one embodiment. Wire slicing machine 100 can be used to carry out slicing operations that cut or shape a workpiece by contacting it with at least one wire. Illustrative but non-limiting examples of a workpiece include blocks or ingots of hard and brittle crystals and ceramics that can have round or square cross-sections as well as spherical, polygonal, or other shapes. Illustrative but non-limiting examples of hard and brittle crystals and ceramics include garnet $((SiO_4)_3)$, sapphire $(Al_2O_3)$, silicon carbide (SiC), yttrium metal garnet (YAG), gallium nitride (GaNi), aluminum gallium nitride (AlGaNi), gallium arsenide (GaAs), indium gallium arsenide (InGaAs), indium gallium nitride (InGaNi), germanium, and so forth.

In one embodiment, the wire utilized in wire slicing machine 100 is a fixed abrasive wire in which abrasive grains or grits are bonded to a core made of materials such as stainless steel, other suitable metals, and so forth. In one embodiment, the abrasive grains are superabrasives that can include, e.g., natural or synthetic diamond or cubic boron nitride (CBN). Bonding can be realized through brazing, electroplating or other suitable processes employed to secure the abrasive material to the core. In one embodiment, Saint-Gobain Abrasives' Winter diamond wires may be used in wire slicing machine 100. Typically these diamond wires are available in diameters that range from about 180 microns (μm), on a 150 μm core, to about 430 μm, on a 300 μm core. Those skilled in the art will recognize that other abrasive coated wires can be employed with wire slicing machine 100, as can be other suitable diameters. Although the description that follows is directed to using a fixed abrasive wire, those skilled in the art will recognize that aspects of the invention are applicable to wire slicing machines that utilize bare wires in conjunction with abrasive slurries, as well as other types of wires.

Referring back to FIG. 1, wire slicing machine 100 is shown having a housing 105 that contains a wire handling assembly 110 that can among other functions, automatically wind wire to build a wire field for use in performing slicing operations. In one embodiment as shown in FIG. 1, housing 105 includes a door 115 that enables an operator 120 to have access to wire handling assembly 110. Also, housing 105 may include windows 125 that allow operator 120 to view the automatic winding of wire, building of the wire field and wire slicing operations. Attached to one side of housing 105 is a controller 130 that enables operator 120 to select various process operations that can be performed by wire slicing machine 100. Examples of such process operations can include automatic winding of wire, building of the wire field and wire slicing. In addition to selecting a particular process operation, controller 130 can be used by operator 120 select and enter various parameters that affect each of the above-noted process operations. For example, operator 120 can enter how much wire is to be wound in a winding operation or in the building of the wire field, the pitches associated with the wire, the width of the pitches and pitch winding. Those skilled in the art will recognize that these are only a few parameters that operator 120 can input to controller 130 to control process operations and that there are a variety of other parameters that can be used by controller 130 to control these operations. For example, other parameters may include, wire elongation at failure, wire tension, variable field tension, etc. Although FIG. 1 shows controller 130 at the side of housing 105, those skilled in the art will recognize that additional components of controller 130 that facilitate performance of the above-noted operations may be built into wire slicing machine 100.

Wiring handling assembly 110 as shown in FIG. 1 includes a wire spool assembly 135 in which wire is wound thereon. In one embodiment, the wire spool assembly 135 as shown in FIG. 1 may include two spooling roller drums (e.g., a single layer dual drum spooling assembly) that spool a single layer of wire therebetween. Those skilled in the art will recognize that the single layer dual drum spooling assembly is only one possible implementation and that wire spool assembly 135 may include only one spooling roller drum (hereinafter referred to as a wire spool). Furthermore, wire spool assembly 135 may support more than one layer of wire as opposed to only a single layer. Wire from wire spool assembly 135 is directed to wire guide assembly 140 which include guide rollers which are grooved to a constant pitch in order to fashion a wire field. In one embodiment, as shown in FIG. 1, wire guide assembly 140 includes three guide rollers, however, it is possible to use more or less (e.g., four guide rollers) to form the wire field. A workpiece actuator 145 is configured to feed a workpiece 150 into the wire field for a slicing operation. Wire forming the wire field is spooled in a back and forth manner between wire spools so that fresh wire is fed into the slicing zone of the wire field and used wire is removed. Details of wiring handling assembly 110 are described below in more detail.

Figure 2:
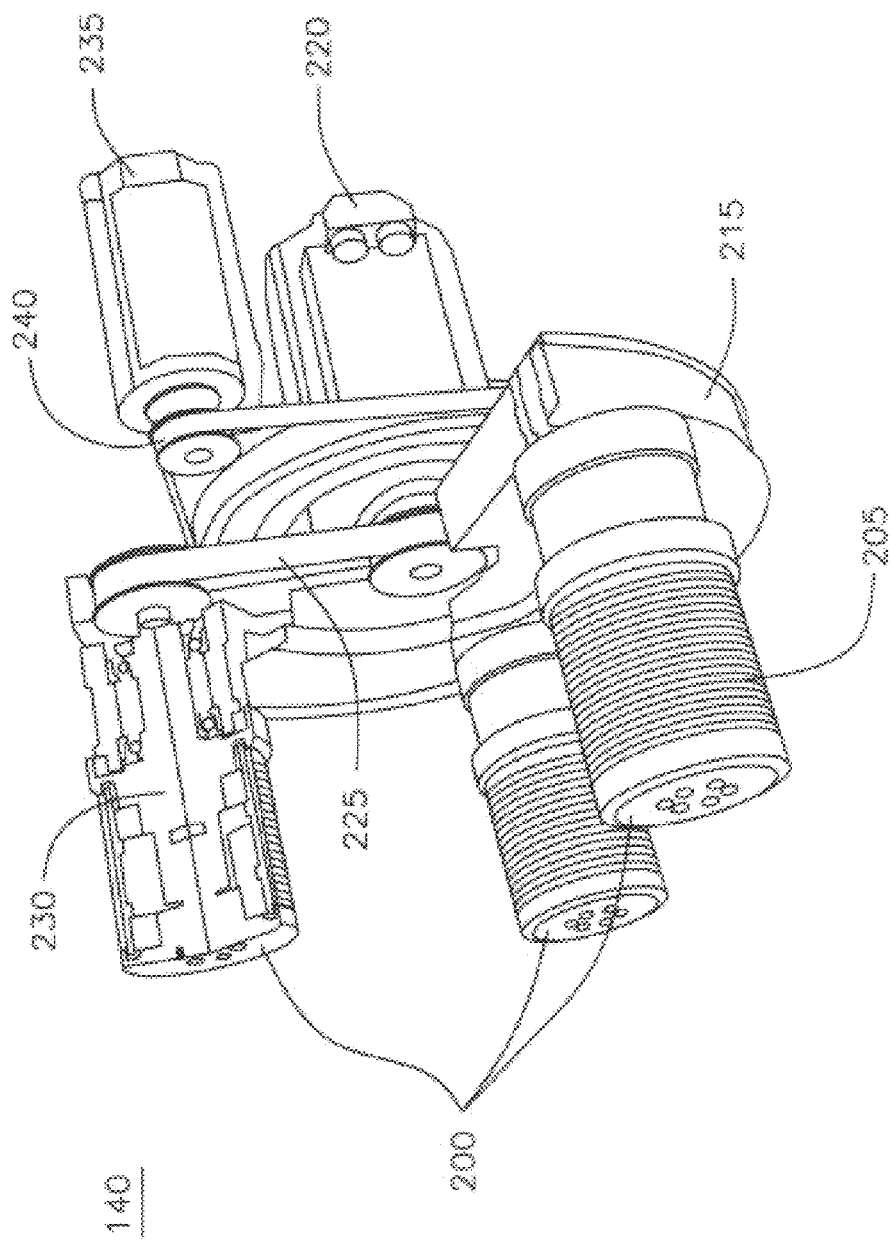
FIG. 2 is a perspective view with a cut-away view of a wire guide assembly used in the wire slicing machine depicted in FIG. 1 according to one embodiment.

FIG. 2 provides a more detailed view of wire guide assembly 140. In particular, FIG. 2 shows a perspective view with a cut-away view of components of wire guide assembly 140 according to one embodiment. As shown in FIG. 2, wire guide assembly 140 comprises wire guides 200 each having a plurality of grooves 205 that are grooved to a constant wire pitch. Wire guides 200 are mounted on a rotary stage 215. A servo motor 220 such as a spindle drive servo motor uses a belt drive 225 to drive the top center wire guide 200 to rotate in a predetermined direction about a wire guide drive shaft 230. The spinning motion that is transferred to the top center wire guide 200 from belt drive 225 and servo motor 220 is transferred as result of friction of the fixed abrasive wire on the other wire guides 200, causing them to spin about their respective drive shafts at the same time, in the same direction as the top center wire guide. Essentially, the wire field that is built around wire guides 200 will cause them to act as if they are linked together. A servo motor 235 such as a rotary stage servo motor uses a belt drive 240 to drive rotary stage 215 to rotate in a predetermined direction in conjunction with the rotation of wire guides 200. Note that the operation of belt drive 240 for rotating rotary stage 215 occurs without interfering with the operation of servo motor 220. Similarly, the operation of belt drive 225 for rotating wire guides 200 occurs without interfering with the operation of rotary stage 215.

Figure 3:
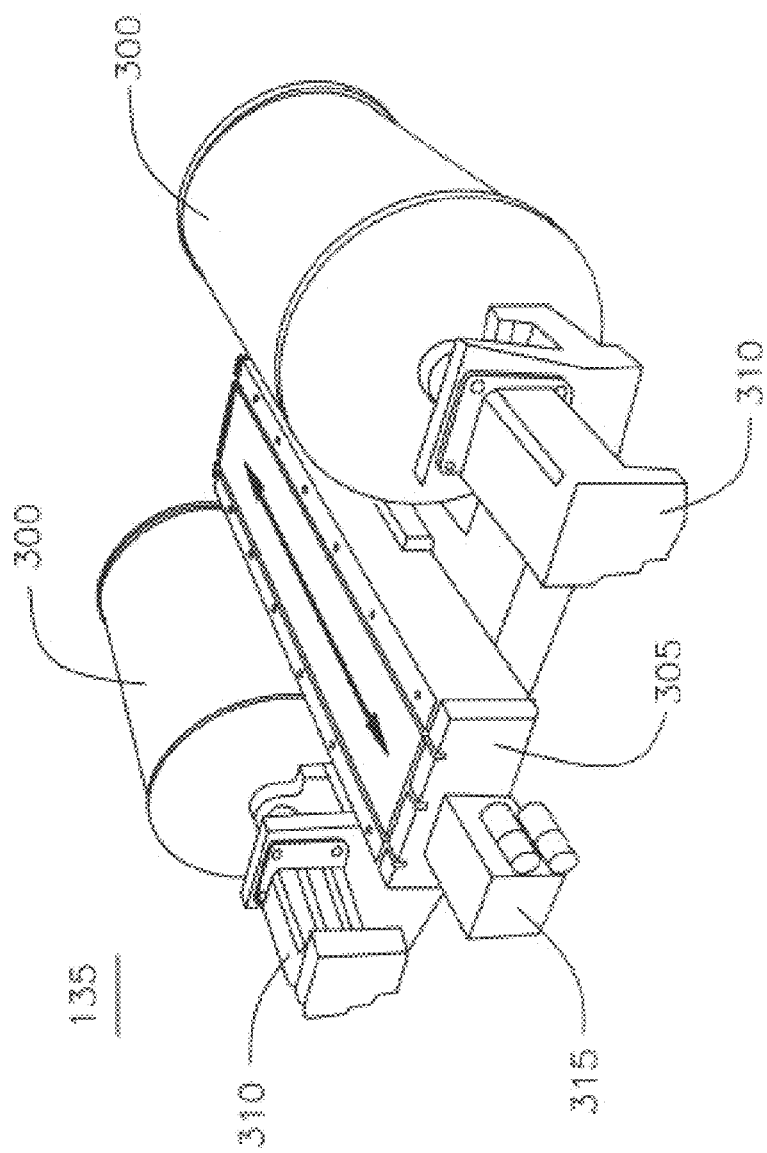
FIG. 3 shows a perspective view of a wire spool assembly used in the wire slicing machine depicted in FIG. 1 according to one embodiment.

FIG. 3 provides a more detailed view of wire spool assembly 135 that is depicted in FIG. 1 according to one embodiment. In particular, FIG. 3 shows a perspective view of wire spool assembly 135 as viewed from the back (opposite door 115). As shown in FIG. 3, wire spool assembly 135 comprises wire spools 300 mounted on a linear positioning stage 305 that allows wire spools 300 to move in a forward direction and in a reverse direction as both indicated by the arrow. Although not shown in FIG. 3, linear positioning stage 305 is preferably mounted to a top section of wire slicing machine 100. Each wire spool 300 has a servo motor 310 such as a spooling roller and tension servo motor that rotates the drums in predetermined direction. Essentially, servo motor 310 keeps wire spools 300 in a constant torque assist mode that maintains tension on the wire during slicing operations. A servo motor 315 such as a linear spooling roller stage servo motor is used to move linear positioning stage 305 in the forward and reverse direction. In essence, servo motor 315 is used to maintain the single layer of wire on wire spools 300. The linear positioning stage 305 moves during slicing and the automatic winding, and as will be explained below, maintains a known position over the wire field that is built around the wire guide assembly 140.

In one embodiment, wire spools 300 can be constructed from aluminum or another suitable material and preferably have a hollow core. To improve traction and reduce or minimize abrasive wear on the surface, one or both spools can be coated with urethane or with another suitable layer or film. Wire can be fixed to the wire spools by a simple clove-hitch knot and the friction of a few rotations of the wire, or by other suitable techniques.

In one embodiment, wire spools 300 can be mounted on shafts (not illustrated) which preferably are secured to linear positioning stage 305 through well known fastening means that may include brackets and pillow block ball bearings. In one embodiment, the shafts on which wire spools 300 are mounted may be connected to servo motors 310 via a servo flexible coupling or other suitable means that are well known in the art.

Figure 4:
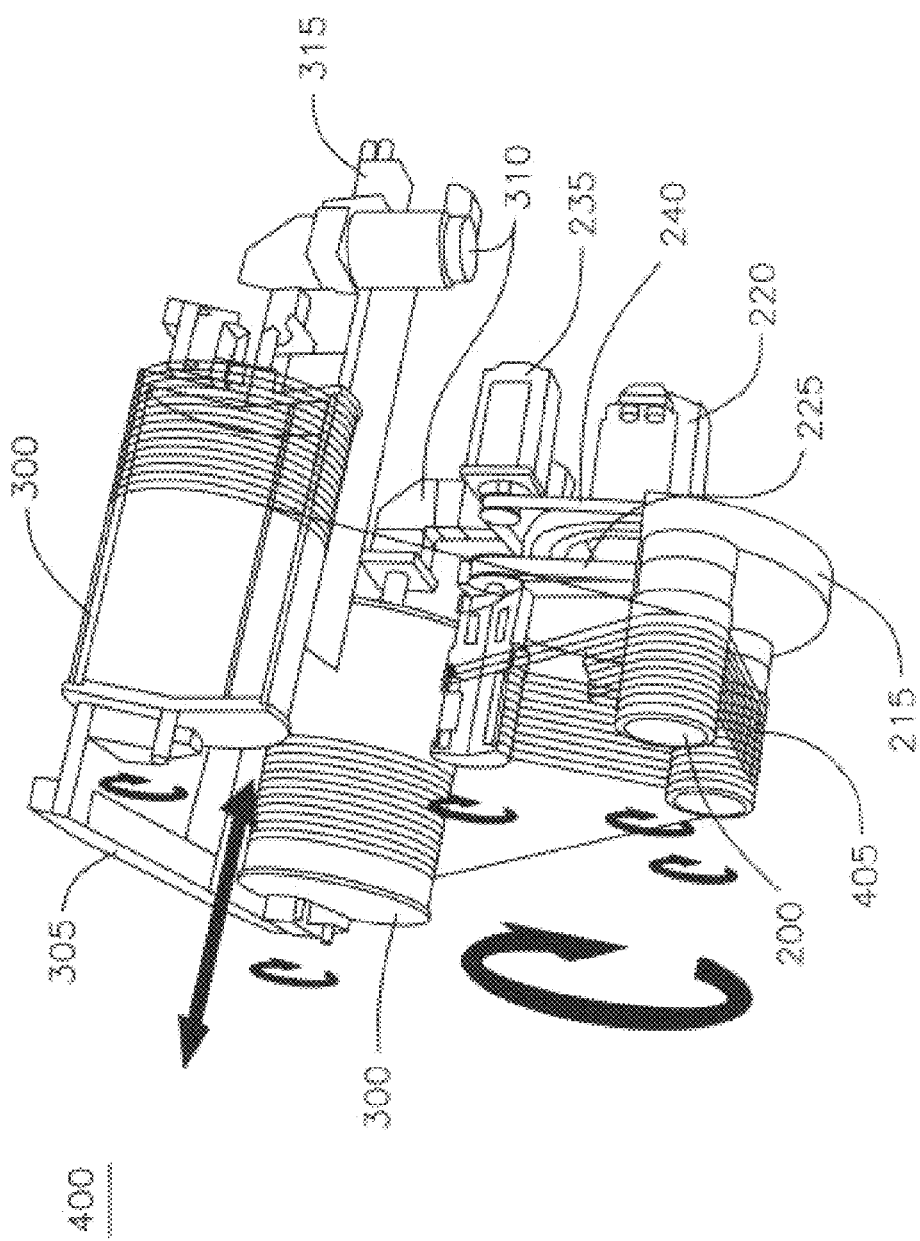
FIG. 4 is a perspective view illustrating the operation of the wire guide assembly and wire spool assembly depicted in FIGS. 2 and 3, respectively, according to one embodiment.

FIG. 4 is a perspective view 400 illustrating the operation of the wire guide assembly 140 and wire spool assembly 135 depicted in FIGS. 2 and 3, respectively, according to one embodiment. In particular, FIG. 4 shows the direction of motions of operation of the wire guide assembly 140 and wire spool assembly 135 during the automatic building of a wire field 405 with fixed abrasive wire. As shown in FIG. 4, wire spools 300 rotate in a clockwise direction. In particular, wire from wire spool 300 on the right-hand side of FIG. 4, is unwound therefrom and wound around wire guides 200. At the same time that wire spools 300 rotate clockwise to unwind the wire, wire guides 200 rotate in a clockwise direction and rotary stage 215 also rotates in the clockwise direction. The rotation of wire guides 200 and rotary stage 215 will pull the wire from the right wire spool 300 as it rotates in the clockwise direction to unwind wire therefrom. Also, at this time, linear positioning stage 305 will continue its positioning in the forward and reverse direction (as indicated by the arrow in FIG. 4) as the wire is being unwound from the right wire spool 300 in order to compensate for unwound wire. In particular, linear positioning stage 305 will move a predetermined amount per spooling roller revolution. In one embodiment, this predetermined amount will depend on wire parameters such, as for example, the width of the wire. In addition to this motion, linear positioning stage 305 will add an additional step motion to the above-noted moving spooling compensation motion once rotary stage 215 makes a full revolution. This step-motion will include a predetermined amount of motion which can depend on a pitch parameter which can include the wire pitch of wire field 405. In essence, this step motion allows the wire spool 300 on the right-hand side to position the wire in the next groove of wire guides 200 during the next revolution so that no wire is overlapped onto itself. This process continues until the whole wire is wound forming wire field 405. As will be described below in more detail, extra wire that remains after initially placing the wire about wire guides 200 is pulled up to wire spool 300 on the left-hand side of FIG. 4 and attached thereto. Wire slicing machine 100 will now be ready for performing slicing operations on a workpiece. Although the description indicates wire is unwound from wire spool 300 on the right-hand side, those skilled in the art will recognize that the wire can be unwound from the wire spool 300 on the left-hand side and fed over to the spool on the right-hand side.

Note that in order to coordinate all of the above-noted motions, servo motors 310 are electronically geared with rotary stage servo motor 235 and servo motor 315. Servo motors 310, rotary stage servo motor 235, servo motor 315 and servo motor 220 operate in accordance with direction provided by controller 130 which also monitors and controls these operations. Furthermore, an operator can use controller 130 (FIG. 1) to change the gearing ratios of the motors in order to account for different wire thicknesses.

Figure 5:
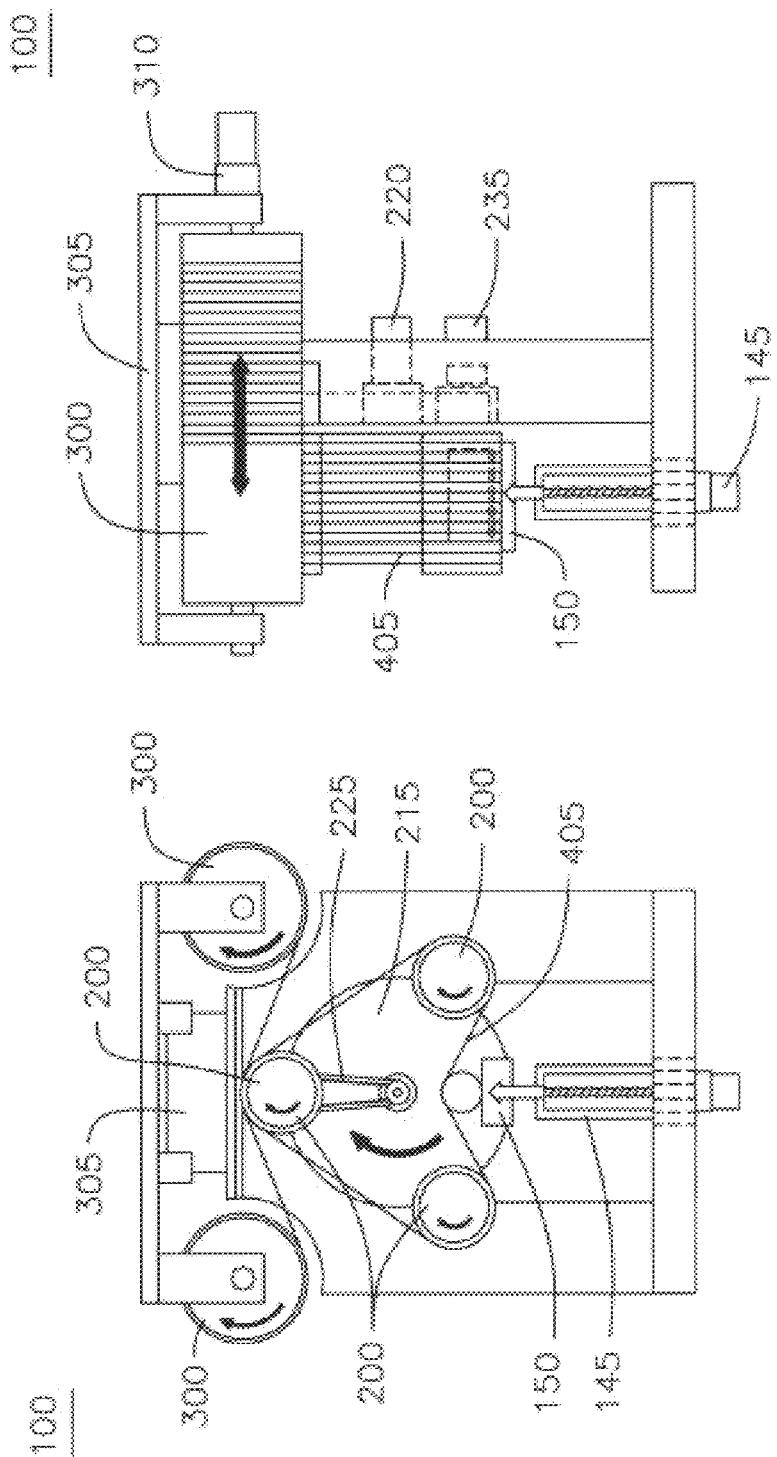
FIGS. 5A-5B show another view of the operation of the wire guide assembly and wire spool assembly as integrated in the wire slicing machine of FIG. 1 according to one embodiment.

FIGS. 5A-5B show another view of the operation of wire guide assembly 140 and wire spool assembly 135 depicted in FIG. 4. In particular, FIGS. 5A-5B show wire guide assembly 140 and wire spool assembly 135 within wire slicing machine 100. FIGS. 5A-5B show a front and side view, respectively, of the operation of wire guide assembly 140 and wire spool assembly 135 within wire slicing machine 100 according to one embodiment. As described with respect to FIG. 4, FIG. 5A shows the particular directions of motion of wire guides 200, rotary stage 215 and wire spools 300. Again, the motion to unwind wire from wire spools 300 and automatically build wire field 405 includes simultaneously rotating wire spools 300, wire guides 200 and rotary stage all in the clockwise direction while moving linear positioning stage 305 in the forward and reverse direction as indicated by the arrow in FIG. 5B in order to compensate for unwound wire remaining on the wire spool 300 on the right-hand side. As mentioned above, linear positioning stage 305 will move a predetermined amount per wire spool revolution that in one embodiment depends on the width of the wire. FIG. 5B illustrates the predetermined amount of movement that linear positioning stage 305 can make to unwind wire from wire spool 300 per revolution and the step motion made by linear positioning stage 305 after rotary stage 215 completes a full revolution in order to position the wire on the next adjacent groove.

As shown in FIGS. 5A-5B, the wire from wire spool 300 on the right-hand side (FIG. 5A) is being automatically unwound and used to build wire field 405 and extra wire has been attached to the wire spool 300 on the left-hand side (FIG. 5A) and made ready for performing slicing operations. To perform slicing operations, workpiece actuator 145 feeds workpiece 150 into wire field 405. Wire slicing machine 100 can then perform a variety of slicing operations on workpiece 150 to obtain a multitude of shapes. For example, a fixed abrasive wire such as one described above, can be employed to produce shapes other than the flat slices obtained in typical process to produce semiconductor wafers. In one embodiment, wire slicing machine 100 can impart multi-axis motion on the wire to produce a curvilinear slicing profile and to generate curved wafers. In another implementation, wire slicing machine can rotate workpiece 150 and perform curvilinear slicing to produce a complex shape such as, for example, a dome, as the wire grinds out material in the workpiece.

During performance of a slicing operation, workpiece 150 is fed through a slicing zone in wire field 405. Wire from the wire spool 300 on the right-hand side (FIG. 5A) will transition back and forth to the wire spool 300 on the left-hand side (FIG. 5A) through the slicing zone. Because a fixed abrasive wire is inherently very strong, the wire can be used for multiple slicing operations and hence not wear quickly as it moves back and forth from wire spool 300 on the right-hand side to wire spool 300 on the left-hand side.

Figure 6:
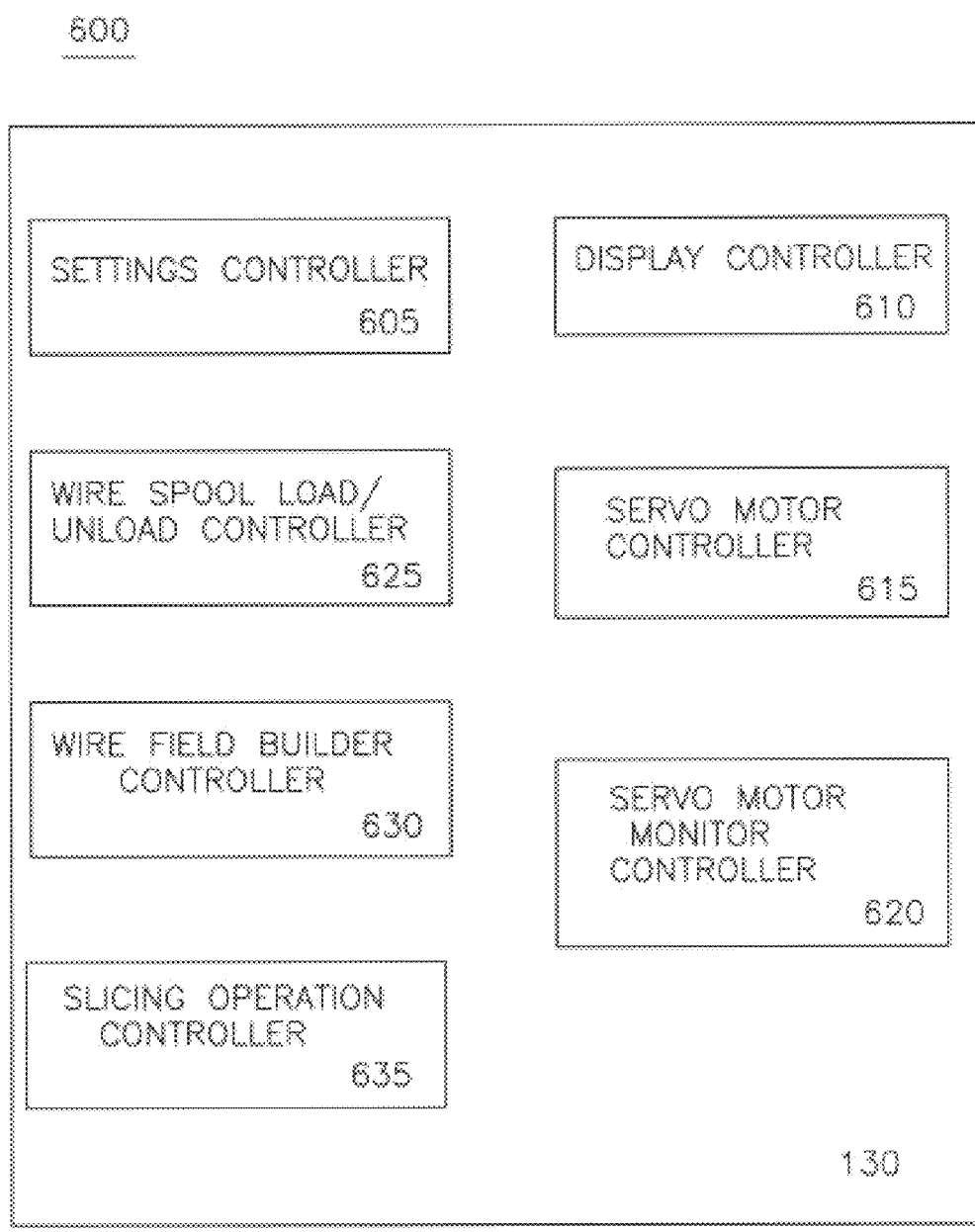
FIG. 6 is a block diagram illustrating some of the functional components associated with the controller shown in FIG. 1 according to one embodiment.

FIG. 6 is a block diagram 600 illustrating some of the functional components associated with controller 130 shown in FIG. 1 according to one embodiment. As shown in FIG. 6, the controller 130 comprises a settings controller 605 that is configured to receive various operator-specified inputs that relate generally to the loading and unloading of wiring on wire spools 300, the building of wire field 405 about wire guides 200, and the type of slicing operation to be performed by wire slicing machine 100. An illustrative, but non-exhaustive listing of inputs that may be specified by operator 120 may relate to the length of wire to be loaded/unloaded and used in the slicing operation, speed of the wire, wire tension, wire winding pitch, pitch grooves, and number of turns for wire guides 200 and wire spools 300. Those skilled in the art will recognize that many other inputs can be specified by operator 120 that could be used by controller 130 to control operations such as wire loading/unloading, wire field building, and wire slicing.

A display controller 610 is configured to display the various operator-specified inputs on a display. Those skilled in the art will appreciate that there are a number of approaches in which the input can be specified by operator 120 and displayed for his or her review that can be implemented herein and will not be discussed in detail. Likewise, output (e.g., feedback of servo motors, time remaining in an operation) that may be generated during any one of the operations performed by wiring slicing machine 100 may be displayed to operator 120 through the use of display controller 610.

Depending on the inputs specified by operator 120, controller 130 will then initiate an operation that may include loading and unloading of wiring on wire spools 300, building of wire field 405 about wire guides 200, and performing a slicing operation. The loading and unloading of wiring on wire spools 300, building of wire field 405 about wire guides 200, and performing a slicing operation will be controlled by a wire spool load/unload controller 625, wire field builder controller 630 and slicing operation controller 635, respectively. To perform these operations, wire spool load/unload controller 625, wire field builder controller 630 and slicing operation controller 635 will work in conjunction with servo motor controller 615 to drive motors 220, 235, 310 and 315 to enable wire guides 200, wire spools 300, rotary stage 215, belt drives 225 and 240, linear positioning stage 305 to move in the above-described manner. While motors 220, 235, 310 and 315 are in operation, a servo motor monitor controller 620 will monitor the operation of the motors and provide feedback to servo motor controller 615 to aid in controlling the performance of the motors while performing any one of these operations.

FIG. 6 only shows the components of the controller 130 that facilitate a general understanding of the approach used to automatically unload/load wire on wire spools 300 and build wire field 405 about wire guides 200. Those skilled in the art will recognize that the controller 130 can have additional components not shown in FIG. 6. For example, the controller 130 may have components to control movement of workpiece actuator 145 and monitor sensors that may be placed near the wire field to monitor the condition of the wire used by wire slicing machine 100.

Controller 130 can take the form of an entirely hardware embodiment, an entirely software embodiment or an embodiment containing both hardware and software elements. In a preferred embodiment, the functions performed by the controller 130 to facilitate any one of the above-mentioned operations may be implemented in software, which includes but is not limited to firmware, resident software, microcode, etc.

Furthermore, the processing functions performed by the controller 130 to facilitate any one of the above-mentioned operations can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the computer, instruction execution system, apparatus, or device. The computer readable medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include a compact disk-read only memory (CD-ROM), a compact disk-read/write (CD-R/W) and a digital video disc (DVD).

Figure 7:
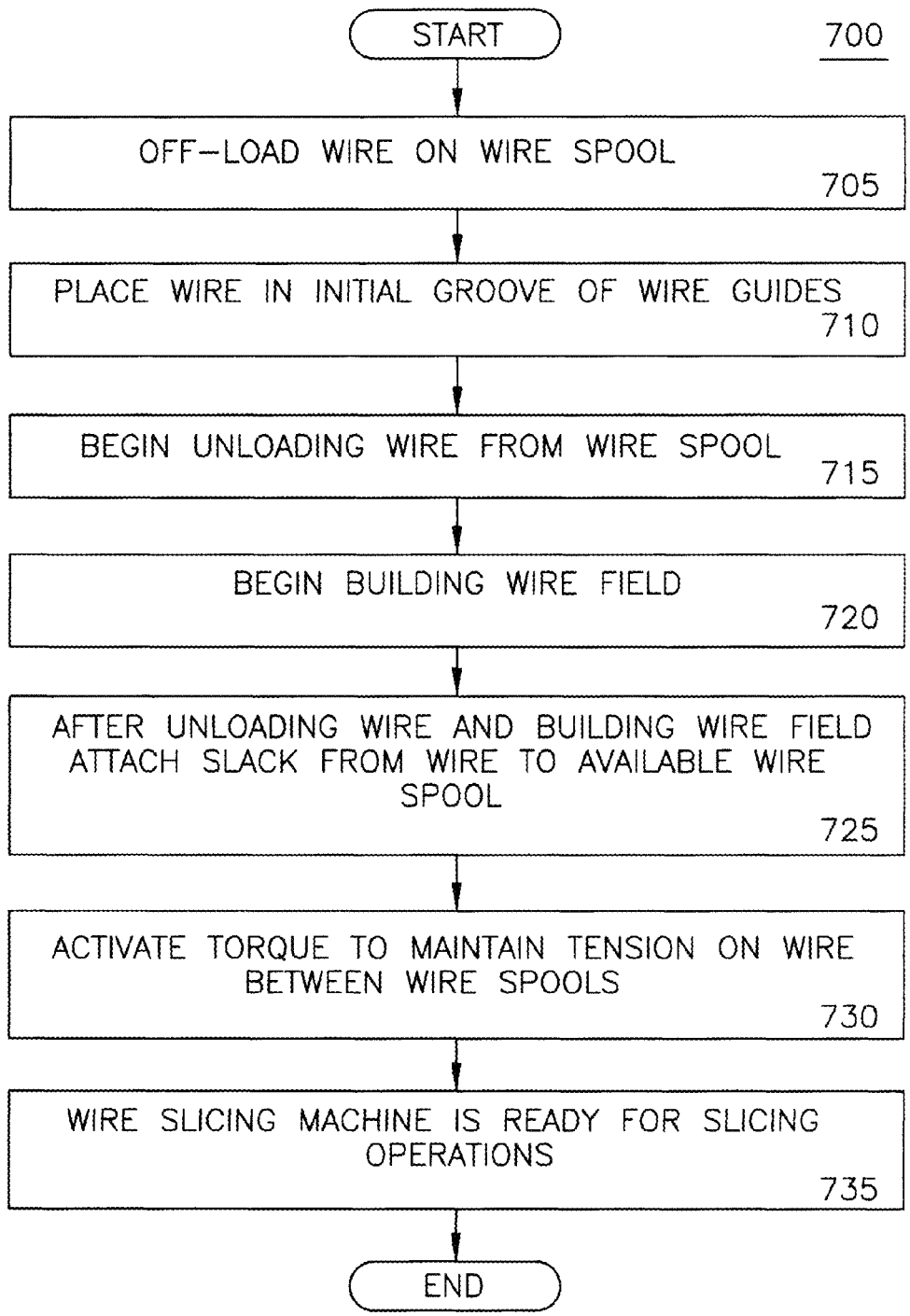
FIG. 7 is a flow chart describing the automatic building of a wire field in the wire slicing machine depicted in FIG. 1 according to one embodiment.

FIG. 7 is a flow chart 700 describing the automatic building of a wire field in wire slicing machine 100 as depicted in FIG. 1 according to one embodiment. Before the automatic building of wire field 405 can begin, operator 120 needs to mount the wire from the manufacturer's spool onto wire spool 300 at 705. This act generally includes placing the spool of wire near wiring slicing machine 100 so that operator 120 can take an end of wire from this spool and attach it to one of the wire spools 300 to begin off-loading of the wire. Operator 120 will then enter the amount of wire that is to be off-loaded onto one of the wire spools 300 by entering this information at the display panel of controller 130. One example of an amount of wire that can be off-loaded onto a wire spool 300 is 1 kilometer. The relevant spooling roller drum 300 will then begin spinning and pulling wire off the manufacturer's spool. Eventually, a single layer or multiple layers of wire will be wound on wire spool 300.

At 710, operator 120 then places wire in the initial groove of wire guides 200. In particular, operator will manually take an end of wire from wire spool 300 that has the wire and place it around the initial groove of each of wire guides 200. In one embodiment, operator places the wire in the innermost groove of each wire guide 200 and leaves a portion of the wire unattached for subsequent attachment to the spooling roller drum currently not in use.

Operator 120 then uses the display panel of controller 130 to input operating parameters that relate to the wire and the pitch of wire guides 200. Examples of information that may be input include the number of grooves in wire guides 200, groove width, wire field pitch, the amount of wire to be loaded around wire guides 200. Those skilled in the art will recognize that additional parameters may be specified by operator 120 and used by controller to build the wire field.

In response to receiving the operator-specified inputs, controller will then begin unloading wire from wire spool 300 at 715, winding it around wire guides 200 to begin automatically building the wire field at 720. The movements associated with unloading the wire from wire spool 300 and winding it around wire guides 200 include rotating wire guides 200 and rotary stage 215 concurrently while wire spool 300 is rotating to unwind the wire. During this time, linear positioning stage 305 will move in the forward and reverse direction as the wire is being unwound from the wire spool 300. For example, if the wire is 0.3 mm wide then linear positioning stage would move 0.3 mm per spooling revolution of wire spool 300. Once rotary stage 215 makes a full revolution, linear positioning stage 305 will make the step motion to position the wire in the next groove of wire guides 200. For example, if it is desired to have a wire field pitch of 1.3 mm, then linear positioning stage 305 will step over 1.3 mm to position the wire in the next adjacent groove in wire guides 200 once rotary stage 215 makes the full revolution. This process repeats until wire field is built about wire guides 200.

Moving in the above manner, wire field 405 may be built around wire guides 200 such that the wire from wire spool 300 is first wound around the initial groove of the lower right wire guide 200, then to the initial groove of the lower left wire guide 200 and then to the initial groove of the top wire guide (FIGS. 4 and 5A). Then the automatic building of the wire field continues by winding the wire around lower right wire guide, then to lower left wire guide and then to the top wire guide (FIGS. 4 and 5A). This pattern of winding will then continue until the wire field is built. For example, for 1 kilometer of wire, this pattern of winding will contain about 100 such turns.

Referring back to FIG. 7, after the wire field has been built around wire guides 200, the extra wire that remains after initially placing the wire about the initial grooves of wire guides is pulled up to the other wire spool 300 and attached thereto at 725. In order to perform a slicing operation, servo motors 310 and 315 are then activated at 730 to apply a pre-set torque on the wire attached to the wire spools 300 to maintain a set tension on the wire. The wire slicing machine 100 is then ready for performing slicing operations on a workpiece at 735.

The foregoing flow chart shows some of the functions associated with building of a wire field in wire slicing machine 100 and using the wire to initiate slicing operations. In this regard, each block represents a process act associated with performing these functions. It should also be noted that in some alternative implementations, the acts noted in the blocks may occur out of the order noted in the figure or, for example, may in fact be executed substantially concurrently or in the reverse order, depending upon the act involved. Also, one of ordinary skill in the art will recognize that additional blocks that describe the processing functions may be added.

From the description heretofore, it becomes apparent that embodiments of the present invention provide several advantages over the conventional approach of manually building a wire field. For example, an automated wire field building approach as described herein greatly reduces the time to build a wire field from up to four hours to as low as 5 minutes or even less. In addition, embodiments of the present invention can facilitate consistent control of tension in the wire field as opposed to an inconsistent tension that results from using one's hand or a weighted tension device to build the wire field. Furthermore, the automated approach of the embodiments of the present invention can aid in eliminating wire damage that is typically caused by operator handling.

While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the disclosure.

What is claimed is:

1. A wire handling assembly, comprising:
    at least one wire spool;
    one or more wire guides operatively connected with the at least one wire spool; and
    a controller operatively in communication with the at least one wire spool and the one or more wire guides, wherein the controller is configured to direct the at least one wire spool and one or more wire guides to automatically unload wire from the at least one wire spool and build a wire field about the one or more wire guides, wherein the at least one wire spool is rotatably mounted about a linear positioning stage, wherein the linear positioning stage is configured to move the at least one wire spool along a linear axis as the at least one wire spool rotates in a first predetermined direction, and
    wherein the one or more wire guides is rotatably mounted abotu a rotary stage, wherein the rotary stage is configured to rotate in a second predetermined direction as the one or more wire guides rotates in a third predetermined direction.

2. The wire handling assembly according to claim 1, further comprising a wire spool servo motor configured to drive operation of the at least one wire spool.

3. The wire handling assembly according to claim 1, further comprising a linear positioning stage servo motor configured to drive operation of the linear positioning stage.

4. The wire handling assembly according to claim 1, wherein the first, second and third predetermined directions comprise the same direction.

5. The wire handling assembly according to claim 1, further comprising a servo drive motor configured to drive operation of the one or more wire guides.

6. The wire handling assembly according to claim 1, further comprising a rotary stage servo motor configured to drive operation of the rotary stage.

7. The wire handling assembly according to claim 1, wherein the linear positioning stage moves the at least one wire spool in conjunction with the rotation of the one or more wire guides and the rotation of the rotary stage.

8. The wire handling assembly according to claim 7, wherein the rotation of the one or more wire guides and rotary stage pulls wire from the at least one wire spool about a groove of each the one or more wire guides in accordance with a predetermined wire field pitch.

9. The wire handling assembly according to claim 8, wherein the linear positioning stage continuously moves a predetermined amount per revolution of the at least one wire spool to adjust a position of the linear positioning stage with respect to the at least one wire spool to compensate for unwound wire on the at least one wire spool.

10. The wire handling assembly according to claim 9, wherein the linear positioning stage adds a step motion to the continuously adjusting position movement in response to the rotary stage attaining a full revolution to position the wire for placement in an adjacent groove.

11. A method of automatically building a field of fixed abrasive wire in a wire slicing machine having at least one wire spool configured to accommodate a fixed abrasive wire and one or more wire guides that receives the fixed abrasive wire from the at least one wire spool on a plurality of grooves, the method comprising:
    automatically unloading the fixed abrasive wire from the at least one wire spool onto one or more wire guides; and
    automatically building a field of fixed abrasive wire about the one or more wire guides, wherein the automatically unloading of the fixed abrasive wire and building of the wire field comprises rotating the one or more wire guides simultaneously as the fixed abrasive wire is spooled around each groove,
    the method further comprising moving the at least one wire spool in a stepping motion at a predetermined period to enable stepping over a groove of the one or more wire guide for placement of the fixed abrasive wire on an adjacent groove.

12. A non-transitory computer readable storage medium storing computer instructions, which when executed by a computer system enables a wire slicing machine to automatically generate a wire field for performing a slicing operation, the computer instructions comprising:
  loading a wire onto at least one wire spool;
  automatically unloading the wire from the at least one wire spool onto one or more wire guides; and
  automatically building the wire field about the one or more wire guides in accordance with a plurality of wire parameters, wherein the automatically unloading of the wire and building of the wire field comprises instruction for rotating the one or more wire guides simultaneously as the wire is spooled around each groove formed in the one or more wire guides,
  the computer readable storage medium further comprising instructions for moving the at least one wire spool in a stepping motion at a predetermined period to enable stepping over a groove of the one or more wire guides for placement of the fixed abrasive wire on an adjacent groove.

* * * * *